United States Patent [19]

Ide, III

[11] 3,934,990

[45] Jan. 27, 1976

[54] AIR COOLER AND CLEANER FOR COMPRESSED AIR

[75] Inventor: Thomas N. Ide, III, Drexel Hill, Pa.

[73] Assignee: Stratoflex, Inc., Fort Worth, Tex.

[22] Filed: Mar. 17, 1972

[21] Appl. No.: 235,767

[52] U.S. Cl. .................... 55/218; 55/269; 55/337; 55/414; 55/432; 55/DIG. 25; 137/204
[51] Int. Cl.² ........................................ B01D 45/12
[58] Field of Search ............ 55/267, 269, 218, 337, 55/414, 432, DIG. 25, 417, 459, DIG. 17; 137/204

[56] References Cited
UNITED STATES PATENTS

| | | | |
|---|---|---|---|
| 1,436,099 | 11/1922 | Hill | 55/459 X |
| 1,774,295 | 8/1930 | Smallhouse | 55/267 |
| 2,009,352 | 7/1935 | Adams | 55/269 |
| 2,399,468 | 4/1946 | Cole | 285/381 X |
| 3,093,467 | 6/1963 | McLaughlin | 55/269 X |
| 3,114,566 | 12/1963 | Coberly et al. | 285/381 X |
| 3,402,529 | 9/1968 | Frantz | 55/267 |
| 3,440,800 | 4/1969 | Messen-Jaschin | 55/337 X |
| 3,483,677 | 12/1969 | Pinto | 55/DIG. 17 X |
| 3,516,231 | 6/1970 | George | 55/267 |

Primary Examiner—Frank W. Lutter
Assistant Examiner—William Cuchlinski, Jr.
Attorney, Agent, or Firm—Leonard L. Kalish

[57] ABSTRACT

An air cooler and cleaner for cooling compressed-air coming from an air-compressor and for removing the moisture content thereof and for removing lubricant oil and solid particles and other contaminants which may be entrained therein. The air cooler and cleaner includes a tubular aluminum housing and an upper housing-closure and a lower housing-closure. Sheet-aluminum cooling fins having housing-receiving openings and cylindrical spacer and heat-conductor collars around said openings heat-shrunk onto the housing in firm thermally-conductive contact therewith and spacing the fins in relation to each other. A swirl-chamber in the lower portion of the housing and a cooling-chamber in the upper portion of the housing. The swirl-chamber has a tangential air-inlet for rapidly spinning the air therein. An inverted cylindrical cup-like air-director within the cooling-chamber for directing the air against and along the wall of the cooling-chamber in a thin layer. A funnel-like member including a flange a short distance below the air-director for separating the swirl-chamber from the cooling-chamber and having a central opening and an air-riser-tube extending down from said opening into the swirl-chamber to a substantial depth thereof. An air-outlet port in the upper closure for the discharge of the cooled and cleaned air. A filter in the upper end of the tubular housing, through which the compressed-air passes. A contaminant drain-opening in the swirl-chamber and an automatic drain-valve connected with the drain opening.

14 Claims, 18 Drawing Figures

Fig. 2.

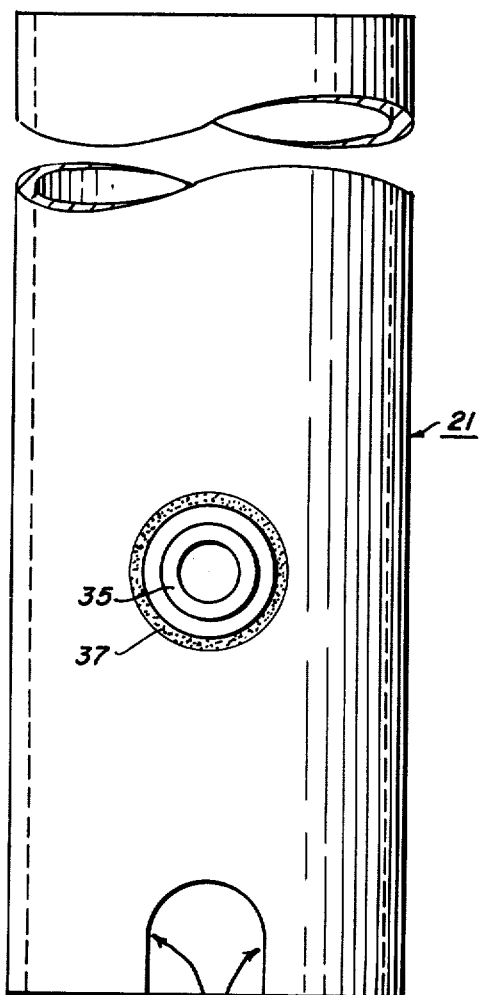
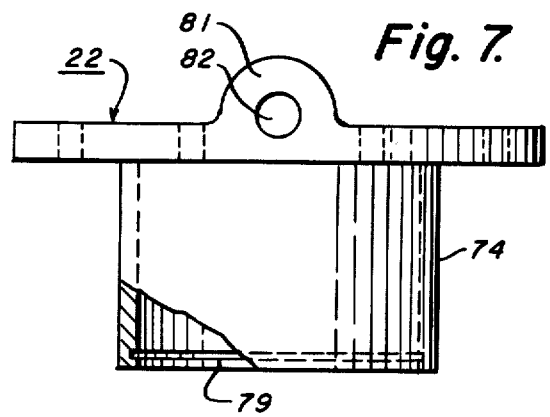
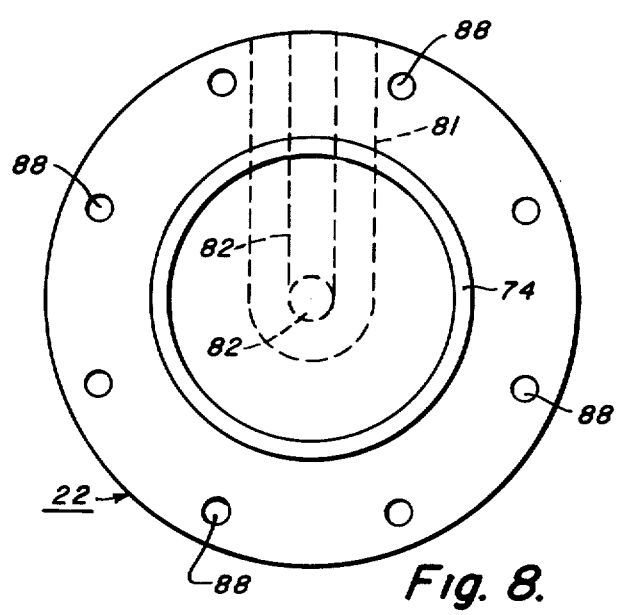
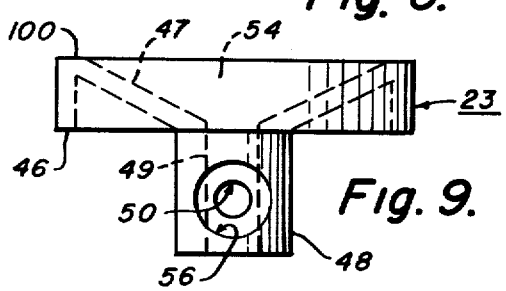
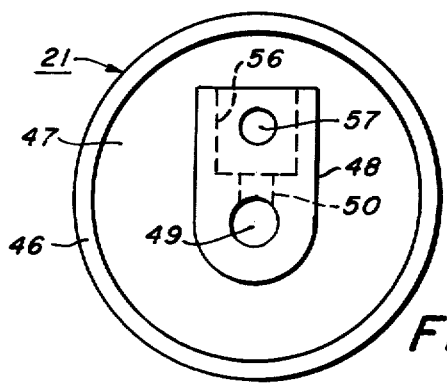
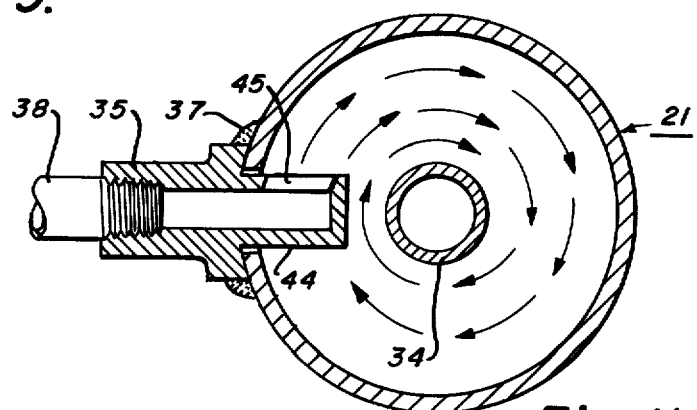

AIR COOLER AND CLEANER FOR COMPRESSED AIR

THE FIELD AND OBJECT OF THE INVENTION, AND THE PRIOR-ART

The invention relates to air cooling and cleaning apparatus for use in connection with the development of a compressed-air supply for operating air-brakes on automotive equipment or for use in many industrial applications, as, for instance, compressedair operated tools, valves and instruments, and other compressedair operated or controlled equipment.

The compression of the air, by means of an air-compressor, to a pressure in the customary range (of 80 to 150 pounds per square inch or more) raises the temperature of the air by several hundred degrees, as, for instance, 300°F, more or less, depending on the pressure. For efficient storage and use, the temperature of the compressed-air must be reduced as near ambient temperature as possible. The compressed-air, as it leaves the compressor, may also have entrained therein some of the lubricant-oil used to lubricate the compressor or an air-whipped or aerated and perhaps somewhat aqueous emulsion-like form of such oil, and may also have entrained therein dust and other solid contaminants such as carbon particles resulting from the carbonization of lubricant oil. Another contaminant and frequently the largest contaminat is the moisture drawin into the compressor along with the atmospheric air. The extent of this contaminant varies of course with the degree of humidity. However, whatever the humidity, moisture and water entrained in the compressed-air leaving the compressor represents a hazard in the operation of air-brakes and other equipment to be operated or controlled by the compressed-air.

The object of the present invention is the efficient and reliable cooling of the compressed-air and the removal therefrom of its moisture or water content and the removal therefrom of the oil (or emulsion) discharged by the compressor and dust and carbon particles and other contaminants entrained therein;- while the compressed-air flows from the compressor to the storage-reservoir. A further object is a construction in air coolers and cleaners which is durable, trouble-free and economical to manufacture.

Many different compressed-air coolers and cleaners have heretofore been devised, and some of them have been marketed. The following are the prior patents of which I am aware, disclosing air coolers and cleaners: U.S. Pat. Nos. 1,485,055; 1,735,441; 2,195,565; 2,226,045; 2,535,760; 2,840,183; 3,093,467; 3,402,529; 3,426,508; 3,516,231.

BRIEF SUMMARY OF THE INVENTION

The compressed-air cooler and cleaner of the present invention is preferably formed, in the main, of aluminum or an aluminum alloy having a high thermal conductivity and high tensile strength, and it includes a generally upright cylindrical tubular body or housing formed of thick-walled tubing extruded out of such aluminum or aluminum alloy. A funnel-like member, whose flange is of a diameter neatly fitting into the inner diameter of the tubular housing, divides the tubular housing into a relatively short lower swirl-chamber or spin-chamber and a relatively longer (or higher) upper cooling-chamber, with the tube of the funnel extending down deep into the swirl-chamber. A drain-opening is provided at or near the bottom of the swirl-chamber, to which opening an automatic pilot-air-controlled drain-valve is connected. A compressed-air inlet communicates with the upper portion of the swirl-chamber and is arranged to deliver the incoming compressed-air tangentially of the swirl-chamber. An upper housing-closure or lid is secured to the upper end of the tubular housing, in fluid-sealed relation thereto, and has an air-delivery or exit opening extending therethrough. A hollow cylindrical nonmetallic air-director of low thermal conductivity, having its upper end closed and its lower end open, is operatively and co-axially disposed within the cooling-chamber, with the outer surface thereof spaced a short distance radially inwardly from the inner surface of the cooling-chamber, so as to form a narrow vertical air-passageway of annulus-shaped cross-section between the inner surface of the cooling-chamber and the outer surface of the air-director, A filter-chamber or filter-housing is carried by and extends downwardly from the upper housing-closure and is preferably formed integrally therewith, and has an inwardly-extending filter-supporting flange at the lower end thereof.

The tubular housing has a uniform interior diameter throughout its length. The flange of the funnel is supported horizontally on the heads of three equidistantly spaced rivets whose stems extend through and suitably beyond and are fluid-tight in corresponding holes through the wall of the tubular housing, and the outer ends of the stems are riveted over on the outside, against the outer surface of the tubular housing.

The lower open end of the air-director is supported on a stepped-diametered perforated disc whose upper small-diametered portion is snugly telescoped into the lower end of the air-director, and such disc is in turn supported by the flange of the funnel through three or four equidistant short vertical spacer-members. The air-director-supporting disc has three or four equidistantly spaced laterally-extending centering projections which extend out to the inner surface of the wall of the tubular housing and thus space the lower end of the air-director uniformly in relation to such inner surface of the housing. The upper closed end of the air-director is similarly spaced from the inner surface of the wall of the housing, in co-axial relation thereto, by lateral projections extending outwardly from the upper closure or lid thereof. The short vertical spacers which space the air-director a short distance above the flange or the funnel may be either spacers formed integrally with and extending downwardly from the stepped-diametered director-supporting disc, with their lower ends resting on the flange of the funnel, or such spacers may be short vertical spacers riveted or spot-welded or otherwise secured to the flange of the funnel, with their upper ends supporting the director-supporting disc.

A spring intermediate the filter-housing and the upper closed end of the air-director (or between the upper housing-closure and the upper closed end of the air-director) serves resiliently to press the air-director downwardly and to press the air-director-supporting disc against the aforementioned vertical spacers therebeneath and so to press the funnel-flange against its supporting rivet-heads, so that the space between the lower end of the air-director (or between the lower face of its supporting disc) and the flange of the funnel is no more than the height of the aforementioned vertical spacers, and yet so that the air-director can be raised upwardly to a slight extent against the force of said spring if the free passage of the compressed-air requires the raising of the air-director. The filter within the filter-housing is pressed downwardly against a lower annular filter-supporting flange of the filter-housing by means of a spring between the filter and the upper housing-closure so that if the filter becomes unduly clogged the compressed-air will lift the filter from said supporting flange to permit the compressed-air to bypass the filter.

Generally rectangular sheet-aluminum cooling-fins, having central openings for telescopically receiving the tubular housing and having short cylindrical flanges at their inner diameters, are press-fitted an/or heat shrunk onto the outside of the tubular housing, with the flanges thereof in firm thermally-conductive contact with the outer surface of the tubular housing and spacing the fins from one another.

The compressed-air entering the swirl-chamber tangentially near the top thereof, rapidly spins or swirls downwardly, thereby imposing a centripetal force upon the compressed-air in the swirl-chamber and upon any solid or liquid particles entrained in the compressed-air. The swirling air exits upwardly from the swirl-chamber through the downwardly extending tube of the funnel and enters the cooling-chamber beneath the air-director therein. The air in the space between the lower end of the tube of the funnel and the bottom of the swirl-chamber continues to swirl or spin. The spinning or swirling of the air both above and below the lower end of the tube of the swirl-chamber separates out most of the water, oil and solid particles (entrained in the compressed-air) before the compressed-air rises upwardly through the funnel-tube for passage between the air-director and the inner wall-surface of the cooling-chamber. The solid particles and oil-droplets and condensed moisture in the form of water droplets which have been so centripetally separated from the swirling compressed-air drop to the bottom of the swirl-chamber and are periodically flushed therefrom through the drain-opening at the bottom of the swirl-chamber by means of the automatic drain-valve connected thereto.

Such moisture as is not condensed and separated from the compressed-air in the swirl-chamber is condensed by the contact of the air with the inner wall-surface of the tubular housing and drains down therealong onto the disc of the funnel and then down into the tube of the funnel and into the swirl-chamber and then drops to the bottom of the swirl-chamber.

Such air-entrained particles as are not separated from the air in the swirl-chamber are filtered out by the filter which is just beneath the upper housing-closure.

BRIEF DESCRIPTION OF THE DRAWINGS

FIG. 6 represents an elevational view of the empty tubular housing, with only the air-inlet welded thereto;- such air-inlet being either the air-inlet shown in FIGS. 1 and 4 or the air-inlet shown in FIG. 11.

FIG. 7 represents an elevational view of the housing-closure and of the integral filter-housing extending downwardly therefrom; with a portion of the filter-housing shown in section.

FIG. 8 represents a bottom view of the upper housing-closure and of the filter-housing.

FIG. 9 represents an elevational view of the lower housing-closure and valve-mounting member telescoped into and welded to the bottom of the tubular housing, as viewed at 90° degrees to the cross-sectional view thereof shown at the bottom of FIG. 1.

FIG. 10 represents a bottom view of the bottom closure and valve-mounting member shown in FIG. 9.

FIG. 11 represents a cross-sectional view on line 11—11 of FIG. 6.

DESCRIPTION OF EMBODIMENTS OF INVENTION

Figures 1, 2:
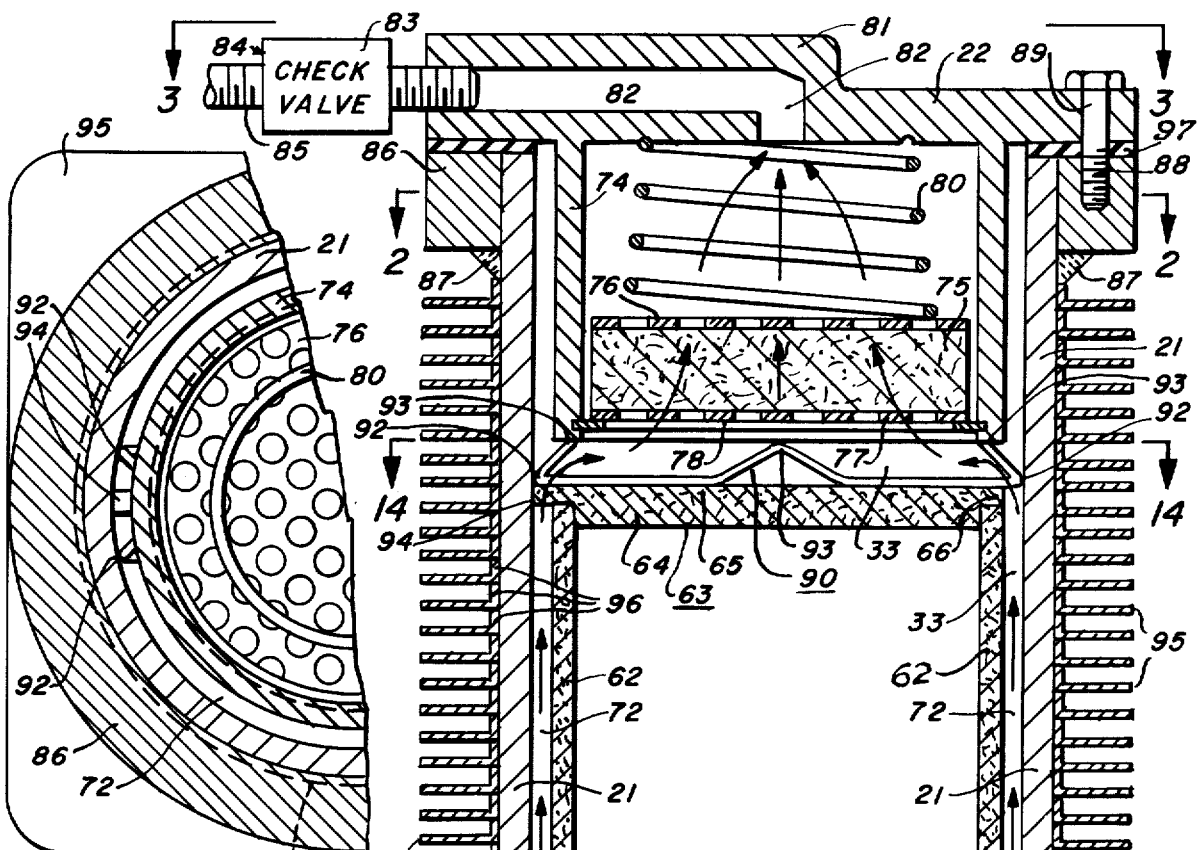
FIG. 1 represents a verticle cross-sectional view of an embodiment of the air cooler and cleaner of the present invention, shown on a somewhat reduced scale.
FIG. 2 represents a horizontal cross-sectional view on line 2—2 of FIG. 1.
Figure 3:
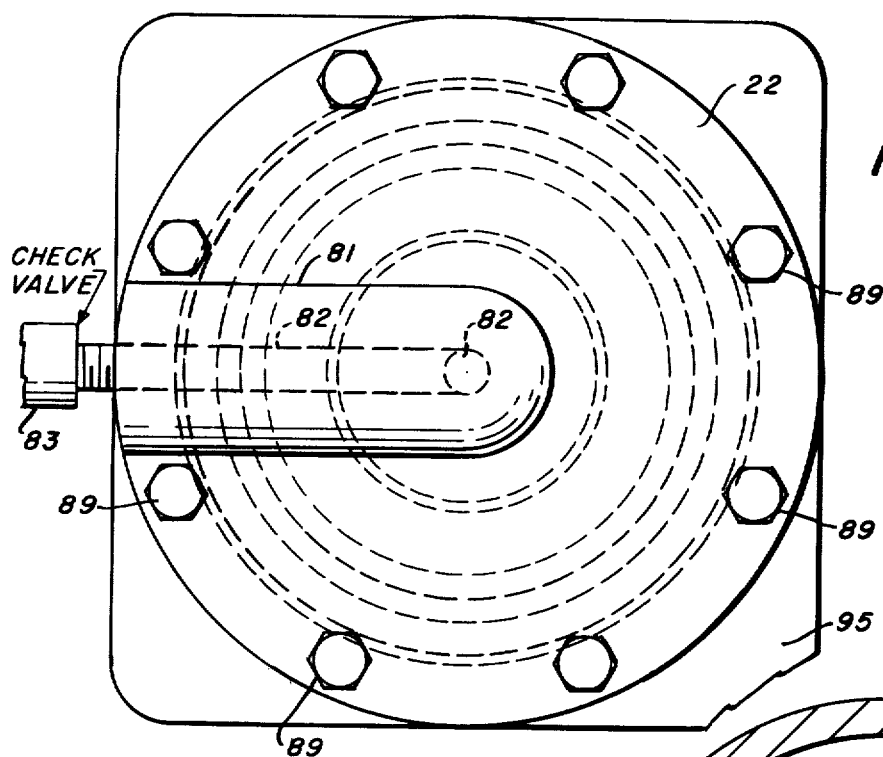
FIG. 3 represents a top plan view on line 3—3 of FIG. 1, of the upper housing-closure and of the corner portions of the uppermost cooling-fin extending outwardly beyond the housing closure.

In the illustrated embodiment of the present invention, the air cooler and cleaner in its entirety (as illustrated in FIG. 1) is designated by the reference-number 20. The tubular housing thereof is designated in its entirety by the reference-number 21, and the upper housing-closure thereof is designated by the reference-number 22, and the bottom housing-closure member thereof is designated by the reference-number 23.

A funnel-like member 24, hereinafter generally referred to as the "funnel", is operatively mounted within the tubular housing 21, in the manner indicated in FIG. 1. The funnel 24 comprises a flange including a horizontal planar outer flange-portion 25 and a conical inner flange-portion 26 having a central opening 27 therein. The outer diameter of the outer planar flange-portion 25 is such that it will fit neatly within the inner diameter of the tubular housing 21, with a minimum clearance required to insert flange into the housing;- such clearance being sufficiently small so that any upward leakage of air between the outer periphery of the planar flange-portion 25 and the inner surface of the tubular housing 21 will be insignificant.

The outer planar flange-portion 25 rests on and is supported by three or four equidistantly spaced and horizontally aligned rivetheads 28 whose stems 29 pass through holes 30 in the tubular housing 21 with a tight fit and with the outer ends 31 thereof riveted over tightly, so that the rivets are in air-tight relation to the housing 21.

The flange (25 and 26) of the funnel 24 divides or separates the tubular housing 21 into a lower swirl-chamber 32 and an upper cooling-chamber 33;- the upper cooling-chamber having a vertical dimension or extent substantially greater than that of the lower swirl-chamber 32.

An air-riser-tube 34 extends downwardly from the hole 24, into the swirl-chamber 32 to a point a short distance above the bottom thereof as indicated in FIG. 1.

Figure 4:
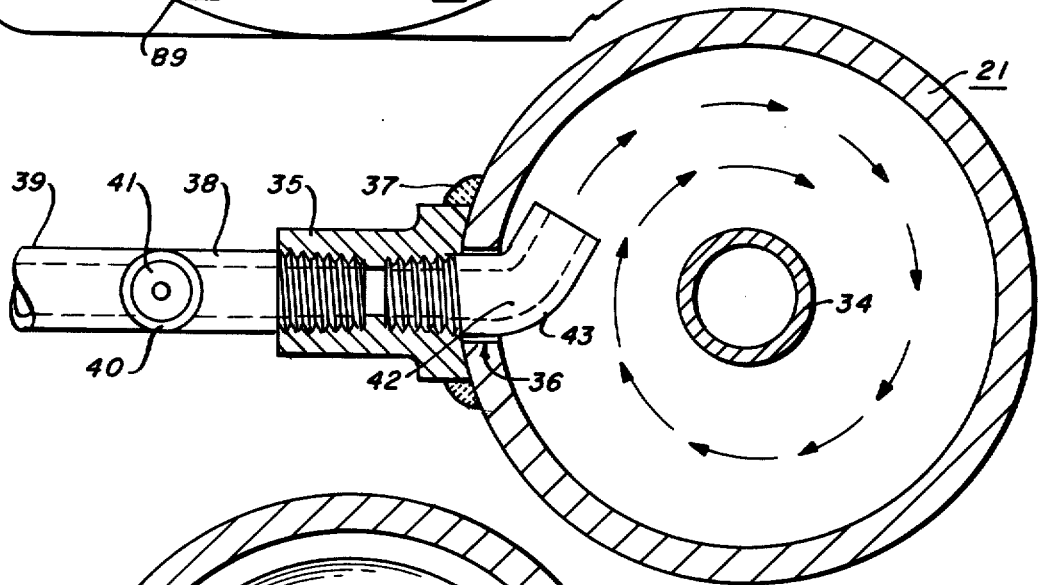
FIG. 4 represents a cross-sectional view on line 4—4 of FIG. 1.

A boss-like fitting 35 is welded to the outer surface of the housing 21, in operative alignment with the inlet openings 36 in the housing 21, by means of the annular fillet-weld 37. The outer end-portion of the boss-like fitting 35 is pipe-threaded to receive a suitable T-fitting 38 whose outer end 39 is connected with the pipe-line which delivers the compressed-air to the air cooler and cleaner, and to the right-angular branch 40 of which any suitable pressure-release-valve or safety-valve is operatively mounted. The inner end-portion of the bore of the fitting 35 may be pipe-threaded as indicated in FIG. 1, and into such inner threaded portion a 45° angled fitting 42 is operatively secured, as indicated in FIGS. 1 and 4; with the inner angled portion 43 thereof formed into a threadless nozzle (as indicated in FIG. 4) for delivering the incoming compressed-air tangentially of the inner surface of the swirl-chamber 32, so as to impart a rapidly spinning or swirling motion to the air descending downwardly through the swirl-chamber.

Instead of providing a separate inner 45°-angled fitting 42 (as in FIGS. 1 and 4), the boss-like fitting 35 may have a coaxial inward extension 44 formed integrally therewith, whose inner end may be closed, and in the side of which a round hole or a slot 45 may be provided with its median plane generally horizontally disposed;- the hole or slot 45 being suitably angled so as to discharge the incoming compressed-air generally tangentially of the inner surface of the swirl-chamber 32, as indicated in FIG. 11.

Figure 5:
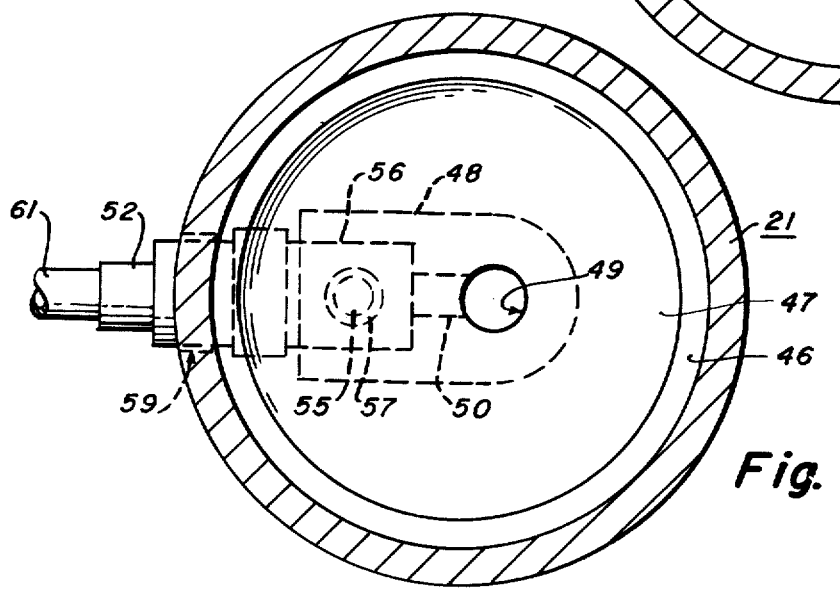
FIG. 5 represents a cross-sectional view on line 5—5 of FIG. 1.

The bottom housing-closure 23 (FIGS. 1, 9, 10 and 5) is preferably cast or forged of aluminum or an aluminum alloy, but may otherwise be formed of aluminum or of an aluminum alloy. The bottom housing-closure 23 includes a cylindrical flange 46 whose outer surface fits snugly within the inner cylindrical surface of the tubular housing 21, and a conical bottom-wall 47 which is preferably coaxial with the cylindrical flange 46. An oblong drain-boss 48 extends downwardly from the conical bottom-wall 47 as shown in FIGS. 9 and 10. The oblong boss 48 has a vertical discharge passageway or sump 49 therethrough, which also extends through the conical bottom-wall 47; discharge hole 49 being off-center in relation to the axis of the cylindrical flange 46, as indicated particularly in FIGS. 1, 5 and 10. A lateral threaded hole 50 extends from the vertical drain-passageway or sump 49, into which hole 50 the threaded pipe-end or nipple 51 of the automatic drain-valve 52 is threaded.

A closure-plug 53 is threaded into the lowermost end of the vertical drain-passageway of sump 49, so that its upper end is at or in close proximity to the hole through the nipple 51, so that when the drain-valve 52 is periodically opened, substantially all the water, oil and solid particles which have accumulated in the sump 49 (and in the conical cavity 54 thereabove) will be flushed out and discharged or "dumped" through the discharge outlet 55 of the automatic drain-valve 52 by the force of the compressed-air within the housing 21 (and within the air-director 62).

The plug 53 in the bottom of the drain-sump 49 may be removed for access to the sump 49 and to the interior of the swirl-chamber for inspection or clean-out, if needed.

Figure 16:
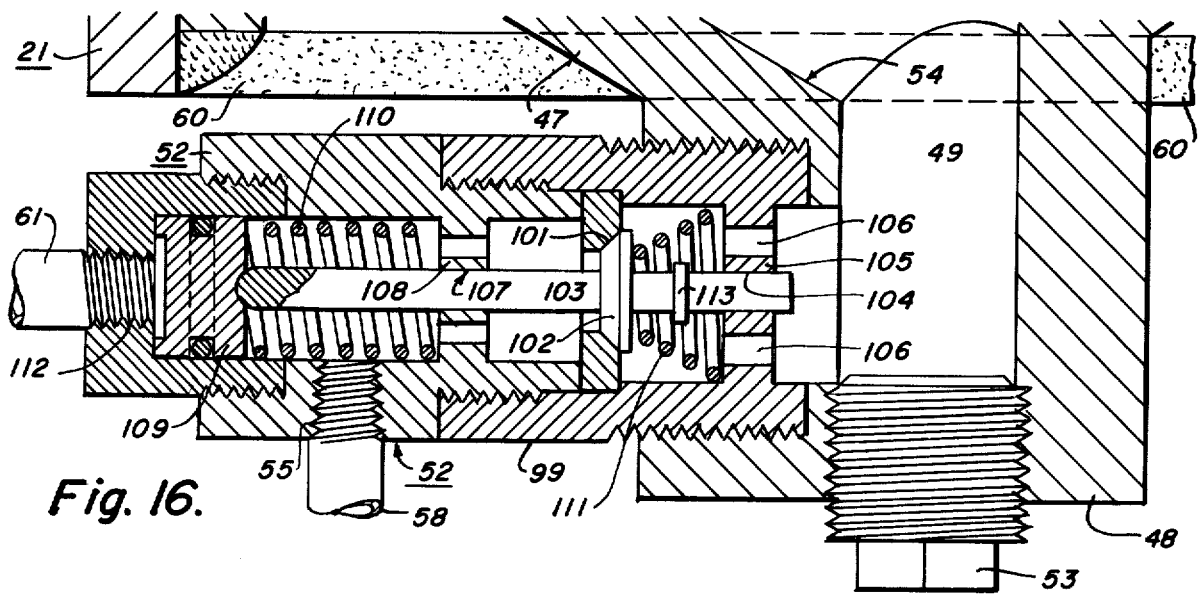
FIG. 16 represents a cross-sectional view of valve 52 of the automotive embodiment of my air cooler and cleaner.
Figure 17:
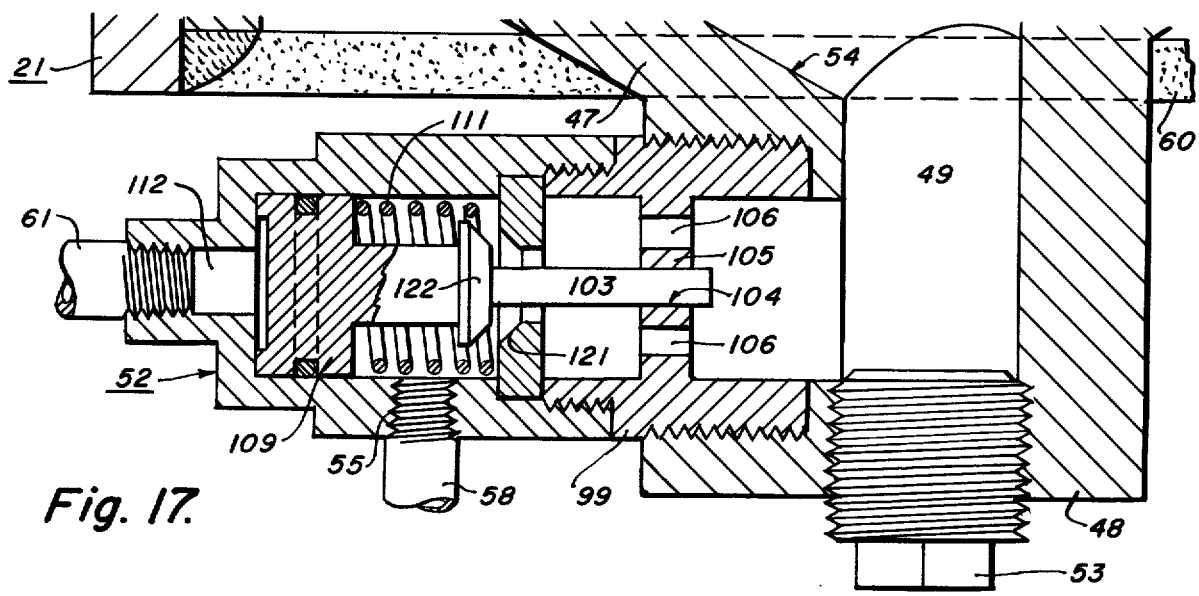
FIG. 17 represents a cross-sectional view of the valve 52 of the stationary embodiment of my air cooler and cleaner.

A lateral cylindrical bore or chamber 56 is provided in the oblong drain-boss 48, coaxial with the lateral opening 50 therein, in which bore or chamber 56 the innermost cylindrical portion 99 of the drain-valve 52 may be snugly nested as indicated in FIG. 1, so that any vibration of the air cooler and cleaner resulting from the vibration of the vehicle on which it is mounted will not tend to break off the nipple 51 nor otherwise adversely effect the attachment of the drain-valve 52 to the lateral drain-opening 50. Alternatively, the innermost portion 99 of the housing of the drain-valve 52 may be screw-threaded into the bore 56, as indicated in FIGS. 16 and 17, or it may be formed integrally with the drain-boss 48.

A vertical clearance-hole 57 is provided in the bottom of the oblong drain-boss 48, through which the drain-valve 52 may discharge the contents of the sump-hole 49 and of the conical cavity 54 thereabove. A pipe-nipple 58 may extend through the hole 57 and be threaded into the drain-hole 55 of the drain-valve 52 for discharging the contents of the sump 49 and of the conical cavity 54 as indicated in FIG. 1, or the bottom of the oblong drain-boss 48 may be cut away beyond the bore or chamber 56 thereof.

A recess 59 is provided at the bottom of the housing 21, as indicated particularly in FIGS. 1 and 6, for clearing the outer portion of the drain-valve 52.

The lower housing-closure 23 is secured to the tubular housing 21 in air-tight relationship thereto, by means of an annular fillet-weld 60 between its flange 46 and the housing 21.

Figure 14:
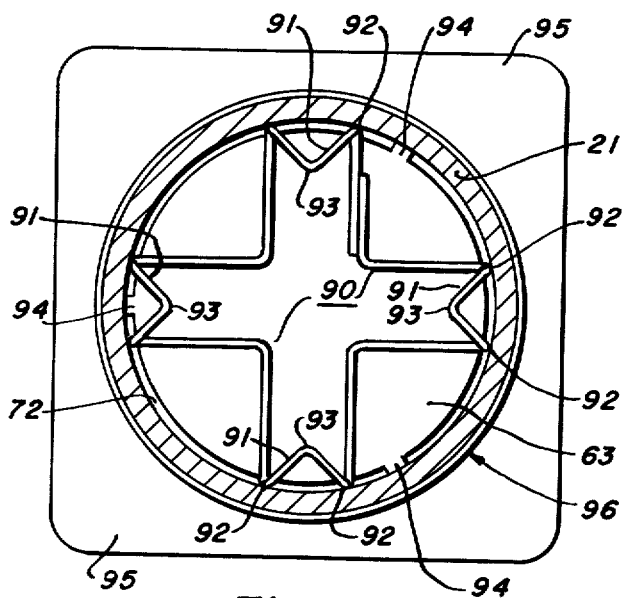
FIG. 14 represents a view on line 14—14 of FIG. 1.

The hollow cylindrical air-director 62 is preferably formed of suitable plastic or hard pressed fibre or impregnated fibre material having very low heat conductivity, and having an upper closure 63 of the same or similar material. Its lower portion 64 is press-fitted and/or cemented into or otherwise secured to the top of the cylindrical body of the air-director 62, and its upper portion 65 has a flange 66 extending outwardly and overlapping the upper end of the tubular body of the air-director 62. At three or four circumferentially distributed points thereof, centering projections 94 extend outwardly from the flange 66 into close proximity of the inner wall-surface of the cooling-chamber 33 (as indicated in FIGS. 1, 2 and 14), for centering the upper end of the air-director 62 in relation to the cooling-chamber 33.

Figure 12:
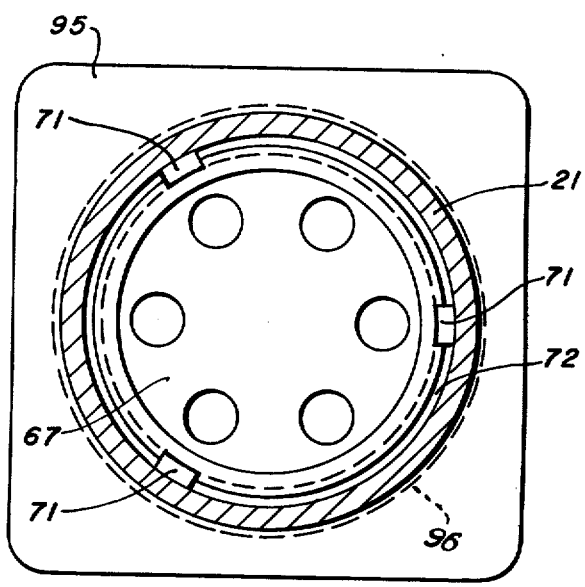
FIG. 12 represents a cross-sectional view on line 12—12 of FIG. 1, showing (among other elements) a bottom view of the air-director-supporting disc.
Figure 13:
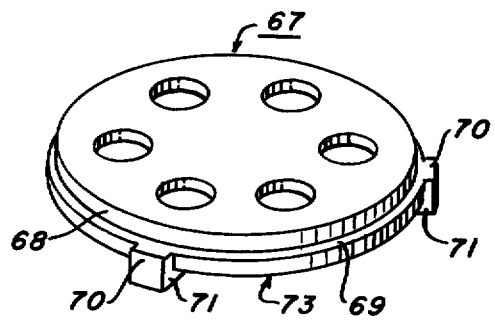
FIG. 13 represents a perspective view of the air-director-supporting disc (shown in cross-section in FIG. 1, and whose bottom view is shown in FIG. 12).

The lower open end of the tubular body of the air-director 62 is supported on a multi-diametered and perforated director-supporting disc 67 shown in FIG. 13. The smaller diametered upper portion 68 of the disc 67 is press-fitted into the lower end of the tubular body of the air-director 62, as indicated in FIG. 1, with the lower end of such tubular body resting on the horizontal shoulder 69 of the disc 67 (FIGS. 13 and 1). Three or four circumferentially distributed integral air-director-centering elements 70 extend laterally outwardly from the disc 67 into close proximity of the inner wall-surface of the tubular housing 21, so as to center the lower end of the air-director in relation thereto. The integral spacers 71 extend downwardly from the centering elements 70 and rest on the outer flange-portion 25 of the funnel 24, as indicated in FIGS. 1, 13 and 12, so as to space the air-director-supporting disc 67 at a distance above the funnel 24 just sufficiently to permit the free passage of the compressed-air between the disc 67 and the funnel-flange (25 and 26) in a laterally outward direction towards the annular air-passage space 72 between the air-director 62 and the inner surface of the cooling-chamber 33, as indicated by the arrows in FIG. 1.

Instead of the downwardly extending vertical spacer 71, vertical spacers of corresponding height may be provided on the planar flange-portion 25 of the funnel 24, by being formed integrally therewith or by being riveted or spot-welded thereto or by being otherwise secured thereto; such alternative vertical spacers preferably extend upwardly to the lower horizontal annular surfaces 73 of the disc 67, so as to space the disc 67 from the flange 25 of the funnel 24 at the same distance as the spacing provided by the vertical spacers 71. Alternatively, a short upstanding peripheral cylindrical spacer-flange may be provided on the funnel-flange (25 and 26) beneath the radial centering-projections 70 of the air-director-supporting disc 67 for supporting the latter and the air-director 62.

The upper housing-closure 22, preferably cast or forged of aluminum or aluminum alloy, has a downwardly extending filter housing 74, preferably formed integrally therewith, in which the filter 75, confined between upper and lower perforated metallic discs 76 and 77, is operatively mounted, as indicated in FIG. 1. An annular retainer-ring 78 is mounted in the ring-receiving groove 79 near the bottom of the filter-housing 74, and supports the lower perforated disc 77 of the filter-assembly as shown in FIG. 1. A suitable helical compression-spring 80 is operatively mounted between the bottom surface of the upper housing-closure 22 and the upper perforated disc 76, so as to press the discs 76 and 77 to the filter 75 and to keep the filter-assemblage seated on the retainer-ring 78.

As the compressed-air is cooled during its upward passage through the annulus-shaped air-passageway 72 (between the wall-surface of the cooling-chamber 33 and the air-director 62) most, if not all, of the moisture content thereof is condensed and flows downwardly as a thin film on the wall-surface of the cooling-chamber 33 and drops onto the funnel-flange (25 and 26) and drains from there into the bottom of the swirl-chamber 32 along the inner wall-surface of the air-riser-tube 34.

For the removal of any traces of moisture which may be still left in the compressed-air after it has risen above the air-director 62, I may operatively mount an air-permeable descicator cartridge (not shown) between filter-assemblage (75, 76 and 77) and the inner surface of the upper housing-closure 22.

Figure 18:
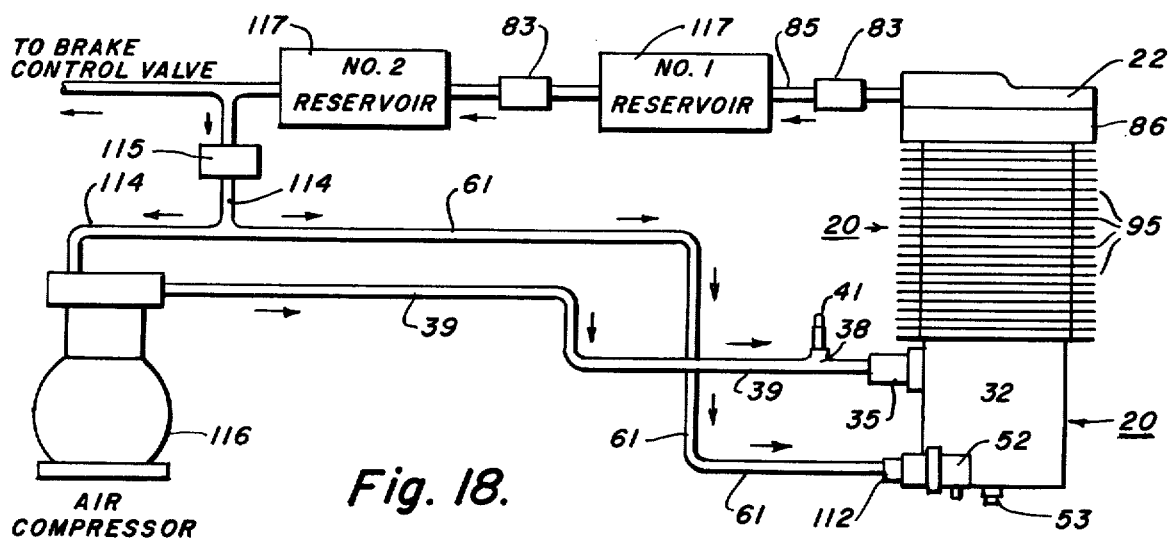
FIG. 18 represents a schematic view of compressor, reservoir and unloader of an automotive air system including the automotive embodiment of my air cooler and cleaner.

The upper housing-closure 22 is provided with an outer boss 81 through which the outlet-opening 82 extends. The outer end of the opening has a check-valve 83 operatively mounted thereto, with the downstream end 84 of the check-valve 83 being connected to the compressed-air reservoir by any suitable piping or tubing 85, as indicated in FIG. 18.

To the upper end of the tubular housing 21, an aluminum or aluminum alloy ring or collar 86 is secured by being press-fitted over and welded thereto by the fillet-weld 87 which may be a continuous annular weld or may be comprised of several circumferentially spaced fillet-welds. The collar 86 is provided with a suitable number of circumferentially distributed tapped holes 88, into which the headed bolts 89 (extending through corresponding holes in the housing-closure 22) are firmly threaded, thereby securing the upper housing-closure 22 to the upper end of the housing 21, as indicated in FIGS. 1, 3, 7 and 8. A suitable sealing gasket 97 is interposed between the upper housing-closure 22 and the upper end of the housing 21, so as to form an air-tight seal therebetween, as indicated in FIG. 1.

Figure 15:
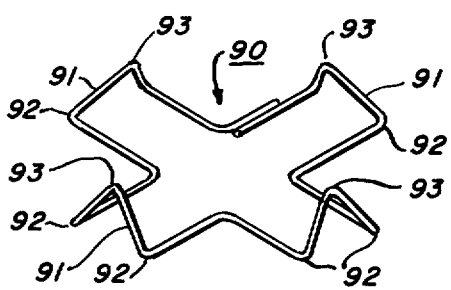
FIG. 15 represents a perspective view of the spring which urges the air-director downwardly.

A spring designated generally by the numeral 90 (shown in FIGS. 1, 14 and 15) has four upper inwardly-inclining V-shaped spring-prongs 91 and rests on top of the upper closure 63 of the air-director 62, with its outermost elbow-like bends 92 in close proximity to the inner surface of the tubular housing 21, so as to be centered thereby, and having the points 93 of its four prongs 91 bearing against the lower annular end of the filter-housing 74 (as indicated in FIG. 1), thereby to exert a resilient downward pressure upon the air-director 62.

The generally rectangular sheet-aluminum (or aluminum alloy) cooling-fins 95, have rounded corners (as indicated in FIGS. 2, 3, 12 and 14) and have central openings therein and have generally cylindrical short integral flanges 96 at their inner diameters, with the inner diameters of such flanges tightly fitting the outer diameter of the tubular housing 21. The inner diameters of the cylindrical flanges 96 of the cooling-fins 95 are preferably made slightly less than the outer diameter of the tubular housing 21, and such flanged fins are telescoped over the tubular housing 21 by being first heated to and maintained at a temperature sufficiently high to increase the inner diameter of the flange 96 thereof to an extent permitting such flanges to be telescoped over the tubular housing 21 and thereafter cooled so as to shrink the flange 96 tightly onto the outer surface of the tubular housing 21 in firm thermally-conductive contact with the outer surface of the tubular housing.

Instead of heating the fins 95 and flanges 96 to sufficiently high temperature (above ambient temperature) to expand the inner diameter of the flanges 96 sufficiently to be telescoped over the tubular housing 21 at ambient temperature, I may, alternatively, chill the tubular housing 21 sufficiently below ambient temperature to reduce its outer diameter sufficiently to fit into the flanges 96 while the later are at ambient temperature. I may both heat the fins 95 (and their flanges 96) and chill the housing 21 so as concurrently to enlarge the inner diameter of the flanges 96 and reduce outer diameter of the housing 21, and then telescope the fins 95 (and flanges 96) and the housing 21 in relation to each other while they are maintained at their elevated and lowered temperatures, respectively. As used in the following claims thereof, the term "heat-shrunk" is intended to cover the firm thermally-conductive contact between the flanges 96 and the housing 21 obtained by any of these three methods.

The flanged fins 95 may also be press-fitted onto the outer surface of the tubular housing 21 along with any of these three heat-shrinkings.

The flanged-fins 95 and the housing 21 are so telescoped in relation to each other either before the collar 86 is applied to the tubular housing 21 or before the air-inlet fitting 35 and the rivets (28 and 29) are applied to the tubular housing; preferably before the latter are applied thereto. Several short circumferentially distributed fillet-welds 98 (FIG. 1) are applied to the lowermost fin 95 and the adjacent outer wall surface of the tubular housing 21, so as to maintain the fins against the separation of the flanges thereof from the next adjacent fin. The uppermost fin 95 is abutted against the fillet-weld 87, which serves as an upper abuttment for the fins.

While in the embodiment of my invention shown in the drawings, the fins 95 are provided only on the portion of the tubular-housing 21 which is generally above the flange (25 and 26) of the funnel 24 (namely, that part of the tubular housing which constitutes the cooling-chamber and the portion thereof immediately above the cooling-chamber), yet for use in warm or hot climates I may also provide similar cooling-fins on the portion of the tubular housing 21 between the inlet-fitting 35 and the valve-clearing recess 59 in the lower end of the housing 21.

For use of my air cooler and drier in extremely cold climate, I may encase or envelope the lower portion of the tubular housing 21, namely, the portion thereof below flange 25–26 of the funnel 24, or the lowermost portion thereof in which the lower housing-closure 23 is mounted (including the bottom thereof across the lower end of the tubular housing 21), in a thermally insulating boot or jacket (not shown), in order to prevent any possible freezing of the water in the swirl-chamber 32 or in the conical cavity 54 or in the drain-sump 49 therebeneath or to prevent any possible freezing of the drain-valve 52.

Instead of the rivets (28–29) for supporting the funnel 24 and the air-director 62, I may provide a spacer between the upper annular shoulder 100 of the lower housing-closure 23 and the lower surface of the flange-portion 25 of the funnel 24. Such spacer may be in the form of a thin-walled aluminum tube snugly fitting into the inner diameter of tubular housing 21 and having a cut-out or hole to clear the inlet-nozzle 42 in FIGS. 1 and 4 or the inlet nozzle 44 (in FIG. 11).

The automatic drain-valve 52 may be of the normally closed type illustrated in FIG. 16 or it may be of the normally open type illustrated in FIG. 17.

In the embodiment of my air cooler and cleaner 20 for use in connection with air-compressors (116) and their storage-reservoirs (117) on automotive equipment, such as trucks, tractors and the like (FIGS. 16 and 18) whose compressor 116 is continuously driven by the engine thereof, the drain-valve 52 is of the normally closed type illustrated in FIG. 16 whose innermost housing portion 99 may be screw-threadedly mounted to (or formed integrally with) the drain-boss 48 of the lower housing-closure 23 of the air cooler and The normally-closed drain-valve 52 shown in FIG. 16 includes a conical valve-seat 101 facing downstream, and a corresponding conical valve-disc 102 facing upstream, carried by a valve-rod 103 whose downstream end is slideably supported in the central hole 104 of the web 105 having through-holes 106 therein, and whose upstream end is slideably supported in the co-axial hole 107 of a similarly appertured web 108. The outer end of the valve-stem 103 abuts against the piston 109. A helical compression spring 110 returns the piston 109 to its retracted position shown in FIG. 16 when compressed-air from the governor unloader valve 115 is not applied thereto, while (under the same condition) the helical compression spring 111 ureges the valve-disc 102 into its seating or closed position shown in FIG. 16. The seating of the valve-disc 102 is also augmented by the pressure of the compressed-air upstream thereof.

The flange 113 on the valve-stem 103 serves to limit the downstream unseating movement of the valve-disc 102. The pipe or tubing 61 from the control-air-port 112 of the drain-valve 52 shown in FIG. 16 is connected to the pipe-line 114 between the governor unloader valve 115 and the air-compressor 116 shown schematically in FIG. 18. Such governor unloader valve 115 is generally mounted between the compressed-air storage-reservoir 117 and the air-compressor 116, so that when the pressure in the storage-reservoir 117 reaches the upper pressure-limit for which it is set, the compressed-air from the storage-reservoir 117 will activate the unloader-valve 115 so that its control-valve is thereby opened to admit compressed-air from the storage-reservoir 117 to the valve de-activator of the air-compressor, which thereby keeps the air-intake valve of the compressor open even though the compressor continues to turn over. So long as the air-intake-valve of the air-compressor is thus kept open, the compressor does not deliver compressed-air to the air cooler and cleaner 20 and hence does not deliver compressed-air to the storage-reservoir 117 therebeyond.

When the pressure of the air in the storage-reservoir 117 drops to the lower pressure-limit for which the governor unloader-valve 115 is set, then its control-valve closes, so that compressed-air from the reservoir 117 is not delivered to the pipe-line 114 leading to the aforementioned valve de-activator of the compressor and so that the line 114 is vented to the atmosphere whereby the air-intake valve of the compressor again closes cyclically during the compression stroke of the piston of the compressor, so that the compressor delivers compressed-air to the air cooler and cleaner 20 and to the storage-reservoir 117 therebeyond. Upon such venting of the line 114, the line 61 connected to the control-air-port 112 of the drain-valve 52 is likewise vented;- with the result that the spring 110 returns the piston 109 to the position shown in FIG. 16, and the spring 111 returns the valve-disc 102 to its closed position as shown in FIG. 16.

In the embodiment of my air cooler and cleaner 20 for use in connection with air-compressors (and their storage-reservoirs) stationarily installed in service-stations, shops, factories, laboratories and the like, where the compressor is completely shut down or stopped whenever the pressure in its storage-reservoir reaches an upper set limit and is then started up again when the lower set limit of pressure is reached in the reservoir, the drain-valve 52 is of the normally open type illustrated in FIG. 17, whose innermost housing portion 99 may likewise be screw-threadedly mounted to (or formed integrally with) the drain-boss 38 of the lower housing-closure 23 of my air cooler and cleaner 20.

In this embodiment the piston 109 and the valve-disc 122 and the valve-rod or the valve-stem 103 may be formed integrally with each other as illustrated in FIG. 17. In this embodiment, the conical valve-seat 121 faces upstream and the correspondingly tapered valve-disc 122 faces downstream, so that the piston-return spring 111 keeps the valve open in the absence of pressure applied to the control-fluid-port 112. In this embodiment the pipe-line 61 is connected to the oil-delivery side or the pressure-side of the oil-pump of the air-compressor (or to the line leading therefrom), so that whenever the compressor is turning over, the valve-disc 122 will be kept in its seated or closed position, against the valve-seat 121, so that the drain-valve 52 is closed whenever the air-compressor is running, and so that whenever the air-compressor is shut down (and the oil-pressure from the oil-pump of the compressor ceases or drops below the required pressure), then the drain-valve 52 shown in FIG. 17 will be opened so as to drain and discharge the contents of the sump 49 and the conical cavity 54 thereabove in the lower housing-closure 23.

The term "pilot-fluid," as used in the following claims, is intended to cover the pilot-air under pressure supplied to the pilot-port 112 through the lines 114 and 61 by the governor unloader valve 115 of or connected to the compressor 116 as in the automotive embodiment illustrated in FIGS. 16 and 18, as well as the pilot-oil under pressure supplied to the pilot-port 112 by the oil-pump of the air-compressor in stationary embodiment illustrated in FIG. 17. The term "pilot-fluid output-port" as used in the claims is intended to cover the compressed-air output-port of the governor unloader valve 115 (FIG. 18) in the automotive use of my air cooler and cleaner 20 as well as the oil-output-port or oil-output-line of the oil-pump of the air-compressor in the stationary use of my air cooler and cleaner 20 (such oil-pump not being shown in the drawings).

In the embodiment of my air cooler and cleaner 20 illustrated in FIG. 1, the extruded aluminum tube constituting the housing 21 is 15 inches long and has a 5¼ inch long outer diameter and a 4¾ inch inner diameter and a wall thickness of ¼ inch, and the fins 95 (and flanges 96) are sheet aluminum having a thickness of about 0.050 inch. These dimensions are stated here for purposes of illustration and without restriction.

To increase the capacity of my air cooler and cleaner, as, for instance, to accommodate larger air-compressors, I generally need only increase the length of the thick-walled aluminum housing tube 21 and correspondingly increase the lengths of the cooling chamber 33 and air-director 62; although I may also increase the vertical dimensions of the swirl-chamber 32 and air-riser-tube 34. The same upper and lower housing-closures (22 and 23) and the same inlet-boss (35) being usable with such lengthened housing-tubes 21, thus conducing to economic manufacture of my air cooler and cleaner.

The aforementioned emulsion-like oil and the water and solid particles entrained in the compressed-air at times result in the accumulation of a sludge in the bottom of an air cooler and cleaner, which tends to become more viscous and at times to cake unless it is fully flushed out with each successive periodic operation of the automatic drain-valve. In order better to assure the adequate flushing out of such sludge upon each operation of the automatic valve 52, I have made the diameter or horizontal dimension of the drain-sump 49 relatively smaller in relation to the diameter or horizontal dimension of the conical cavity 54 and of the swirl-chamber 32 thereabove. As a result, the sludge which is the oldest will accumulate in the small-diametered drain-sump 49 from which it can better be flushed out by the compressed-air thereabove, which passes through the drain-sump at a higher velocity because of the small cross-sectional area thereof (during each "open" phase of the drain-valve 52) whereas the sludge in the cavity 54 or in the bottom of the swirl-chamber 32 can be more readily flushed out by the lower velocity compressed-air sweeping therethrough.

The normally-open automatic drain-valve 52 is shown in FIG. 16 and the normally-closed automatic drain-valve 52 is shown in FIG. 17 only for the purposes exemplifying illustrations of of these automatic drain-valves and without limitation to the specific constructional details shown in these exemplifying illustrations.

The term "aluminum" as used hereinabove and as used in the following claims is intended also to cover aluminum alloys and compositions containing a major proportion of aluminum.

Having shown and described an embodiment of my invention, I claim the following:

1. An air cooler and cleaner for operative mounting in a compressed-air pipe-line between an air-compressor and its compressed-air storage-reservoir, for cooling the compressed-air and for removing therefrom any moisture, lubricating-oil and solid particles which may be entrained therein, said air cooler and cleaner including a cooling-chamber, an unbaffled swirl-chamber adjacent the upstream end of the cooling-chamber, a compressed-air inlet arranged to be connected with the discharge outlet of an air-compressor and communicating with said swirl-chamber in a zone thereof substantially nearer the cooling-chamber than the opposite end thereof and arranged to deliver the compressed-air from the compressor into the swirl-chamber generally tangentially with respect thereto and to freely swirl the compressed-air in the swirl-chamber without baffled interruption, to separate therefrom liquid and solid particles entrained therein, a contaminant-drain-opening forming an exit from said swirl-chamber, and the lower portion of said swirl-chamber being pitched downwardly towards said drain-opening, a member positioned between and separating the cooling-chamber and the swirl-chamber and separating its tangential air-inlet from the cooling-chamber, said member having a hole therethrough, an air-exit tube carried by said member and communicating with and extending from the hole therein into the swirl-chamber a substantial distance beyond its tangential air-inlet, and spaced from said swirl-chamber exit thereby to cause the swirling motion of the compressed-air to extend a substantial distance axially into the swirl-chamber before the compressed-air passes from the swirl-chamber into the cooling-chamber, an automatic drain-valve operatively connected with said drain-opening and having a control-port and arranged to be controlled by a pilot-fluid under pressure from the compressor and arranged to have its control-port connected with the pilot-fluid output-port of the compressor, an air-outlet-port communicating with the downstream side of said cooling-chamber, said swirl-chamber and said cooling-chamber being so arranged with respect to each other that the compressed-air will flow from the swirl-chamber into and through the cooling-chamber, and a check-valve connected with said air-outlet-port for barring the flow of the compressed-air from the storage-reservoir into the cooling-chamber.

2. An air cooler and cleaner according to claim 1, including a filter operatively interposed between the cooling-chamber and the air-outlet-port.

3. An air cooler and cleaner according to claim 1, including an air-director in the cooling-chamber, forming therewith a passageway through which the compressed-air passes, in a relatively thin layer, along the inner wall-surface of the cooling-chamber.

4. An air cooler and cleaner according to claim 3, including spacers extending radially outwardly from the air-director into close proximity of the wall-surface of the cooling-chamber for spacing the air-director with respect to said wall-surface.

5. An air cooler and cleaner according to claim 1, including a housing formed of thick-walled metallic tubing forming the cooling-chamber and the swirl-chamber thereof, and a plurality of separate sheet-metal cooling fins having housing-receiving openings therein and generally cylindrical integral fin-spacing and heat-conducting flanges around said opening through which the housing-tube extends in firm-heat-conductive contact therewith.

6. An air cooler and cleaner according to claim 5, in which the housing-tube is extruded aluminum tubing and in which the cooling fins and flanges thereof are formed of sheet-aluminum.

7. An air cooler and cleaner according to claim 5, in which the flanged cooling-fins are heat-shrunk onto housing-tube.

8. An air cooler and cleaner according to claim 5, including an air-director in the cooling-chamber, forming therewith an air-passageway having an annulus-shaped cross-section of small radial extent through which the compressed-air passes, in a relatively thin layer, along the inner wall-surface of the cooling-chamber.

9. An air cooler and cleaner for compressed-air, including a cooling-chamber, an unbaffled swirl-chamber adjacent the upstream end of the cooling-chamber, an air-inlet communicating with said swirl-chamber in a zone thereof substantially nearer the cooling-chamber than the opposite end thereof and arranged to cause the incoming air to freely swirl therewithin without baffled interruption, a member positioned between and separating the cooling-chamber and the swirl-chamber and separating its tangential air-inlet from the cooling-chamber, said member having a hole therethrough, an air-exit tube carried by said member and communicating with and extending from the hole therein into the swirl-chamber a substantial distance beyond its tangential air-inlet, and spaced from said swirl chamber exit thereby to cause the swirling motion of the compressed-air to extend a substantial distance axially into the swirl-chamber before the compressed-air passes from the swirl-chamber into the cooling-chamber, a drain-opening communicating with the low side of the swirl-chamber, and the low side of said swirl-chamber being pitched downwardly towards said drain-opening, and an automatic drain-valve connected with said drain-opening, an air-outlet-opening communicating with the upper portion of the cooling-chamber, and a check-valve connected to said air-outlet-opening.

10. An air cooler and cleaner according to claim 9, including a generally vertical drain-sump intermediate the swirl-chamber and the drain-opening, said drain-sump having a horizontal cross-sectional area substantially smaller than the horizontal cross-sectional area of swirl-chamber thereabove.

11. An air cooler and cleaner for compressed-air, including a cooling-chamber, an air-director within said cooling-chamber arranged to form with the wall of the cooling-chamber an air-passageway having a relatively thin annulus-shaped cross-section for passing the compressed-air downstream along and in contact with the wall of the cooling-chamber, an unbaffled swirl-chamber adjacent the upstream end of the cooling-chamber, an air-inlet arranged to be connected with the discharge outlet of an air-compressor and communicating with said swirl-chamber and arranged to cause the incoming air to freely swirl therewithin, a member positioned between and separating the cooling-chamber and the swirl-chamber and separating its tangential air-inlet from the cooling-chamber, said member having a hole therethrough, an air-exit tube carried by said member and communicating with and extending from the hole therein into the swirl-chamber a substantial distance beyond its tangential air-inlet, and spaced from said swirl-chamber exit thereby to cause the swirling motion of the compressed-air to extend a substantial distance axially into the swirl-chamber before the compressed-air passes from the swirl-chamber into the cooling-chamber, a drain-opening operatively communicating with the low side of the swirl-chamber and the low side of said swirl chamber which is beyond the intake end of said air-exit tube being pitched towards said drain-opening, and an automatic drain-valve connected with said drain-opening, an air-outlet-opening communicating with the downstream end of the cooling-chamber, and a check-valve connected to said air-outlet opening.

12. An air cooler and cleaner for compressed-air, including a cooling-chamber, an air-director within said cooling-chamber arranged to form with the wall of the cooling-chamber an air-passageway having a relatively thin annulus-shaped cross-section for passing the compressed-air downstream along and in contact with the wall of the cooling-chamber, an unbaffled swirl-chamber adjacent the upstream end of the cooling-chamber, an air-inlet communicating with said swirl-chamber and arranged to cause the incoming air to freely swirl therewithin, a member having a hole therethrough and positioned between and separating the cooling-chamber and the swirl-chamber, an air-conduit carried by said member in registration with the hole therethrough and extending from said member into said swirl-chamber and spaced from the lower end-portion of said swirl-chamber for passing the compressed-air from said swirl-chamber downstream into the cooling-chamber, a drain-opening operatively communicating with the swirl-chamber and the lower end-portion of said swirl-chamber being pitched downwardly towards said drain-opening, and an automatic drain-valve connected with said drain-opening, an air-outlet-opening communicating with the downstream end of the cooling-chamber, and a check-valve connected to said air-outlet-opening.

13. An air cooler and cleaner including an elongated tubular housing formed of thick-walled metallic tubing and closed at each end thereof by closure members secured thereto and having therein an air-cooling chamber in the downstream portion thereof and an unbaffled air-swirl chamber in the upstream portion thereof, a compressed-air inlet arranged to deliver compressed-air into said swirl-chamber near its downstream end and generally tangentially of the inner wall-surface thereof so as to freely swirl the compressed-air in the air-swirl chamber, a member positioned between and separating the cooling-chamber and the swirl-chamber, said member having a hole therethrough, an air-exit tube carried by said member and communicating with and extending from the hole therein into the swirl-chamber a substantial distance beyond its tangential air-inlet, and spaced from said swirl chamber exit thereby to cause the swirling motion of the compressed-air to extend a substantial distance axially into the swirl-chamber before the compressed-air passes from the swirl-chamber into the cooling-chamber, a compressed-air outlet-port communicating with the downstream end of the air-cooling chamber, and a drain-opening communicating with the upstream end-portion of said air-swirl chamber.

14. An air cooler and cleaner including a generally tubular elongated one-piece housing closed at each end thereof by a closure secured thereto and having an air-cooling chamber in the downstream portion thereof and an unbaffled upstream portion, a compressed-air inlet arranged to deliver compressed-air into said housing substantially nearer to its upstream end than its downstream end and generally tangentially of the inner wall-surface thereof so as to swirl the compressed-air in the unbaffled upstream portion of said housing, a member positioned between and separating the cooling-chamber and the upstream portion of the housing and separating the compressed-air inlet from the cooling-chamber, said member having a hole therethrough, an air-exit tube carried by said member and communicating with and extending from the hole therein into the upstream portion of the housing a substantial distance beyond the air-inlet, and spaced from said swirl chamber exit thereby to cause the swirling motion of the compressed-air to extend a substantial distance axially into the upstream portion of the housing before the compressed-air passes therefrom in the cooling-chamber, external cooling-fins on said housing above said compressed-air inlet, a compressed-air outlet port communicating with the downstream end-portion of said cooling-chamber, and a drain-opening communicating with the upstream end-portion of said housing.

* * * * *